(12) United States Patent
Kim et al.

(10) Patent No.: US 7,782,734 B2
(45) Date of Patent: Aug. 24, 2010

(54) OPTICAL PICKUP WHICH IS COMPATIBLE WITH MULTIPLE TYPES OF MEDIA

(75) Inventors: Bong-Gi Kim, Suwon-si (KR); Soo-Han Park, Yongin-si (KR); Jang-Hoon Yoo, Seoul (KR); Hag-Hyeon Jang, Seongnam-si (KR); Ho-Sik You, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1003 days.

(21) Appl. No.: 11/329,069

(22) Filed: Jan. 11, 2006

(65) Prior Publication Data

US 2006/0164953 A1 Jul. 27, 2006

(30) Foreign Application Priority Data

Jan. 25, 2005 (KR) .................. 10-2005-0006510

(51) Int. Cl.
*G11B 7/00* (2006.01)
(52) U.S. Cl. ..................... 369/112.01; 369/112.16; 369/112.23
(58) Field of Classification Search ............. None
See application file for complete search history.

(56) References Cited

U.S. PATENT DOCUMENTS

| 6,791,932 B1 | 9/2004 | Maruyama | |
|---|---|---|---|
| 7,177,101 B2* | 2/2007 | Tanaka et al. | 359/793 |
| 2003/0165107 A1* | 9/2003 | Honda et al. | 369/112.08 |
| 2004/0036972 A1* | 2/2004 | Kimura et al. | 359/570 |
| 2004/0213131 A1* | 10/2004 | Kimura et al. | 369/112.03 |
| 2005/0105446 A1* | 5/2005 | Sakamoto et al. | 369/112.01 |
| 2005/0135220 A1* | 6/2005 | Katayama | 369/112.16 |
| 2007/0109948 A1* | 5/2007 | Tanaka et al. | 369/112.23 |

FOREIGN PATENT DOCUMENTS

| EP | 1 300 838 A | 4/2003 |
|---|---|---|
| EP | 1 471 514 A | 10/2004 |
| EP | 1 422 696 A | 5/2006 |
| JP | 2000-285500 | 10/2000 |
| JP | 2002-197717 | 7/2002 |
| JP | 2003-036559 | 2/2003 |
| JP | 2003-196860 | 7/2003 |
| JP | 2005-011417 | 1/2005 |
| KR | 2004-0045307 | 6/2004 |

* cited by examiner

*Primary Examiner*—Van N Chow
(74) *Attorney, Agent, or Firm*—Roylance, Abrams, Berdo & Goodman, L.L.P.

(57) ABSTRACT

An optical pickup which is compatible with different types of media is disclosed. A plurality of light sources emit light with different wavelengths. Light path changers change the path of light emitted by the plurality of light sources so that the light is incident upon an objective lens. The objective lens focuses the incident light onto a recording medium. A collimating lens is disposed in front of the objective lens to collimate the incident lights. The collimating lens is movable to correct a spherical aberration. A diffractive optical element is disposed in a path of a light with a short wavelength and has a diffractive surface to correct a chromatic aberration.

18 Claims, 3 Drawing Sheets

OPTICAL PICKUP WHICH IS COMPATIBLE WITH MULTIPLE TYPES OF MEDIA

CROSS-REFERENCE TO RELATED APPLICATIONS

This application claims the benefit under 35 U.S.C. §119 (a) of Korean Patent Application No. 2005-6510, filed on Jan. 25, 2005, the entire content of which is hereby incorporated by reference.

BACKGROUND OF THE INVENTION

1. Field of the Invention

The present invention relates to an optical pickup for an optical recording and/or reproducing apparatus which records and/or reproduces information from a disc-type optical recording medium. More particularly, the present invention relates to an optical pickup for recording and/or reproducing information from two or more types of recording media, such as a high density recording medium such as a blu-ray disc and a lower density recording medium such as a digital versatile disc (DVD) and/or a compact disc (CD).

2. Background of the Invention

In an optical recording and/or reproducing apparatus which records information on and/or reproduces information from a disc type recording medium using a light spot that is focused by an objective lens, the recording capacity of the optical disc is determined by the size of the light spot. The size S of a light spot is determined by the wavelength λ of the light and a numerical aperture (NA) of the objective lens, as represented in Equation 1:

$$S \propto \lambda / NA \quad \text{(Equation 1)}$$

Since the emergence of CDs, where data is recorded and/or reproduced by using a light having a wavelength of 780 nm and an objective lens having a numerical aperture of 0.45 or 0.5, considerable research has been conducted into methods to increase information storage capacity by increasing recording density.

A DVD is a recording medium where data is recorded and/or reproduced by using light having a wavelength of 650 nm and an objective lens having a numerical aperture of 0.6 or 0.65. Blu-ray disc (BD) technology has been recently introduced and is a high density recording medium. Data is recorded and/or reproduced by using light having a relatively short wavelength of 405 nm and an objective lens having a numerical aperture of 0.85.

To help minimize coma aberration (the aberration of a light spot due to tilt of the recording medium) in a blu-ray disc, the light transmission layer of the blu-ray disc is only 0.1 mm thick. In addition, the adoption of an objective lens having a numerical aperture of 0.85 requires that the recording medium have a uniform thickness. In particular, since the amount of a spherical aberration is proportional to the fourth power of the numerical aperture of the objective lens and the deviation in thickness of a recording medium, the recording medium must have a uniform thickness with a deviation range of ±3 mm. It is, however, very difficult to fabricate a recording medium within this deviation range. Therefore, an optical pickup apparatus for a BD has a device for correcting for a spherical aberration that occurs due to deviation in the thickness of a recording medium. Moreover, since the blue laser light used in an optical pickup of a BD device has a comparatively large variation of refraction index in an optical medium, compared with the red laser light used in a CD or a DVD, serious chromatic aberration occurs. Furthermore, when the mode of a laser diode is changed from a reproduction power to a recording power, the wavelength shifts momentarily, for example within several microns, thus also requiring correction of a chromatic aberration.

In addition, existing one-time writable DVD-R and CD-R discs are designed for use with light sources having a wavelength of 650 nm and 780 nm. Since the reflectivity of the disks significantly decreases when different wavelengths are used, it is desirable to provide a light source that generates light with a wavelength of 650 nm and 780 nm.

Accordingly, an optical pickup apparatus for use with both a high density recording medium (such as a BD) and a lower density recording medium (such as a DVD and a CD), should have a device for correcting a spherical aberration (for example, a beam expander), a device for correcting a chromatic aberration (for example, a diffractive optical element), and a light source that emits light beams having two or three different wavelengths.

FIG. 1a shows a conventional optical pickup. The pickup comprises a beam expander 10 to correct a spherical aberration that occurs due to differences in thickness of the disc D. As shown in the drawing, the light paths of light emitted from a first source 11 and a second source 12, respectively, are changed by a first beam splitter 13 and a second beam splitter 14 and are then irradiated to the disc D through the beam expander 10 and the objective lens 15.

Here, the first light source 11 is, for example a laser diode for a BD that emits light having a wavelength of 405 nm. The second light source 12 is, for example, a hologram module for a CD and/or a DVD. Lights emitted from the light sources 11 and 12, respectively, are changed into parallel beams by respective first and second collimating lenses 16 and 17 disposed adjacent to the second beam splitter 14. The parallel beams are then irradiated to the disc D and reflected. The beam expander 10 is driven by an actuator 18 and corrects a spherical aberration that occurs due to variations in the thickness of the disc.

Since the conventional optical pickup which is compatible with different types of media explained above uses the beam expander 10 which occupies a comparatively large installation space and also two collimating lenses 16 and 17, it is very difficult to miniaturize an optical pickup which is compatible with different types of media.

FIG. 1b shows another conventional optical pickup which is compatible with multiple types of media. As shown in the drawing, this optical pickup has three light sources 21, 22 and 23 for emitting lights with different wavelengths, respectively and beam splitters 25, 26, 27 and 28 for changing respective paths of lights emitted from the light sources 21, 22 and 23, toward the objective lens 24. The above light is focused into the disc D by the objective lens 24.

Furthermore, the optical pickup has three collimating lenses 31, 32 and 33 for collimating lights emitted from the light sources 21, 22 and 23, respectively. In addition, in this optical pickup, lights with different wavelengths are changed into parallel beams by the collimating lenses 31, 32 and 33 and are incident on the objective lens 24. The collimating lens 31, which is disposed in a light path of the light source 21 for the BD emitting the light having a short wavelength, is driven in order to correct a spherical aberration. To do so, the collimating lens 31 is moved in the direction of its optical axis. The collimating lens 31 also has an irregular diffractive face to correct a chromatic aberration. Accordingly, though it may be miniaturized more than the optical pickup using the beam expander 10 shown in FIG. 1a, it has three collimating lenses 31, 32 and 33, and thus it is still hard to miniaturize an optical pickup.

Accordingly, there is a need for an improved optical pickup which is compatible with multiple types of media and which can be made smaller.

SUMMARY OF THE INVENTION

An aspect of the present invention is to address at least the above problems and/or disadvantages and to provide at least the advantages described below. Accordingly, an aspect of the present invention is to provide an optical pickup which is compatible with different types of media which is capable of correcting a spherical aberration and a chromatic aberration and which has a simple structure that may be miniaturized.

It is another aspect of the present invention to provide an optical pickup which is compatible with different types of media which may reduce the number of parts and be miniaturized by using one collimating lens for lights with different wavelengths.

According to an aspect of the present invention, an optical pickup which is compatible with different types of media includes a plurality of light sources that emit light having different wavelengths. Light path changers change the paths of the lights emitted from the plurality of light sources so that they are incident on an objective lens. The objective lens focuses the incident light onto an optical recording medium. A collimating lens is disposed in front of the objective lens to collimate the incident light, and is driven to correct a spherical aberration. A diffractive optical element is disposed in the path of the light having a shorter wavelength and has a diffractive face to correct a chromatic aberration.

With this construction, a chromatic aberration of light having a short wavelength is correctable by the diffractive optical element, and a spherical aberration is correctable by moving the collimating lens. Since one collimating lens is used for all lights having different wavelengths, the optical pickup has a simple structure and compact size.

The plurality of light sources preferably include a first light source that emits light having a short wavelength compatible with a BD, a second light source that emits light having a long wavelength compatible with a DVD, and a third light source that emits light having a long wavelength compatible with a CD. The second light source and the third light source may be manufactured as a single module.

The light path changers may include a first beam splitter for reflecting light emitted from the first light source toward an objective lens, a second beam splitter for reflecting light emitted from the second light source and for transmitting a light emitted from a third light source, and a third beam splitter for transmitting light that has passed through the first beam splitter and reflecting light that has passed through the second beam splitter.

The collimating lens may be disposed between the third beam splitter and the objective lens so that it is movable along the direction of an optical axis. The diffractive optical element may be disposed between the first beam splitter and the third beam splitter and the diffractive face of the diffractive optical element may be formed on the side face which faces the objective lens.

According to an exemplary embodiment of the present invention, the optical pickup which is compatible with different types of media further includes a detecting unit which receives light that is reflected from a recording medium and passes through an objective lens and a light path changer. The detecting unit detects an information signal and/or an error signal. The detecting unit may include a detecting unit for a BD, a detecting unit for a DVD, and a detecting unit for a CD. The detecting unit for the DVD and the detecting unit for the CD, respectively, may be made in a modular form, integrally with the second light source and the third light source.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the exemplary embodiments of the invention. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Figure 1A:
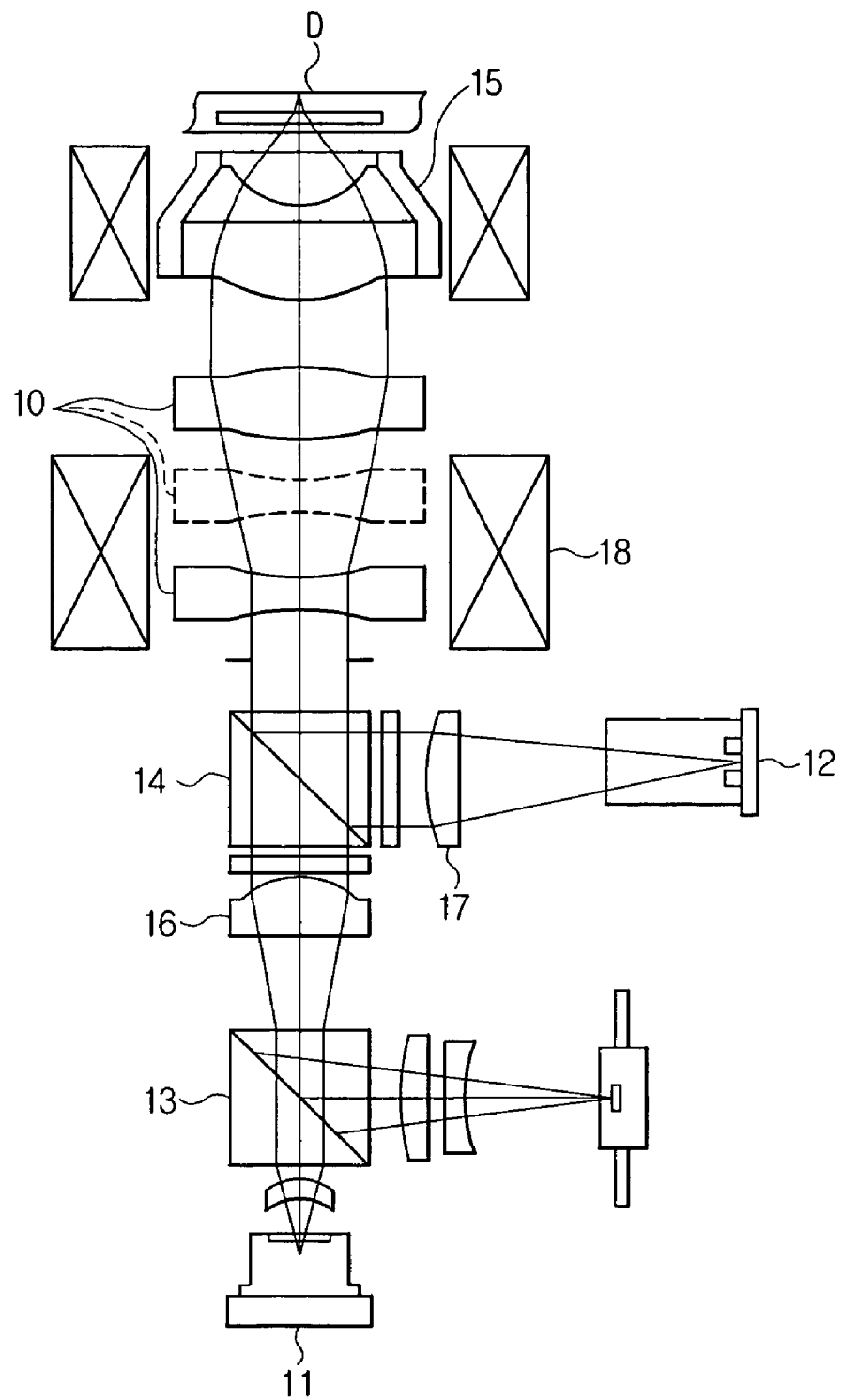
FIGS. 1A and 1B illustrate conventional optical pickups which are compatible with different types of media.
Figure 1B:
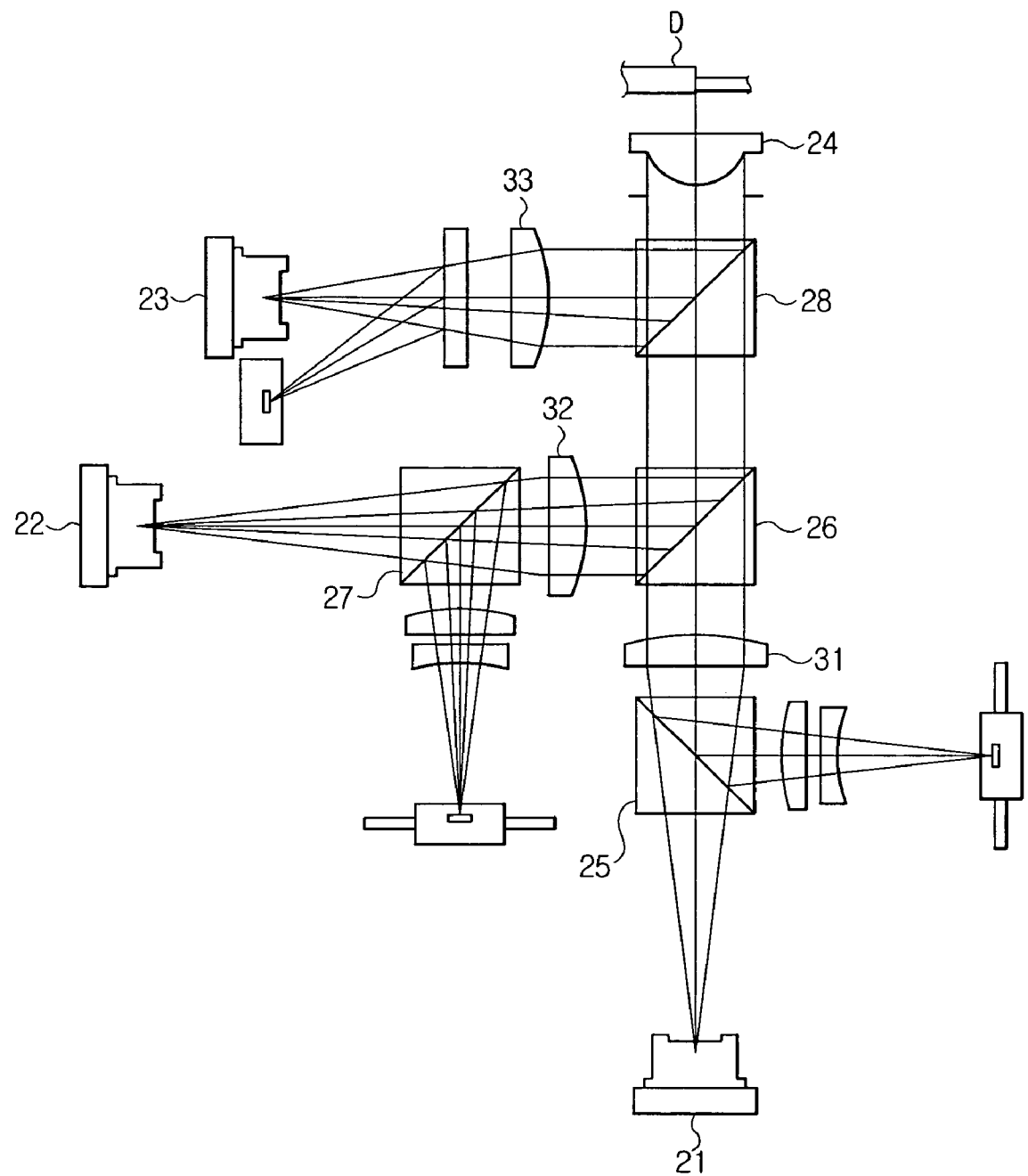
Figure 2:
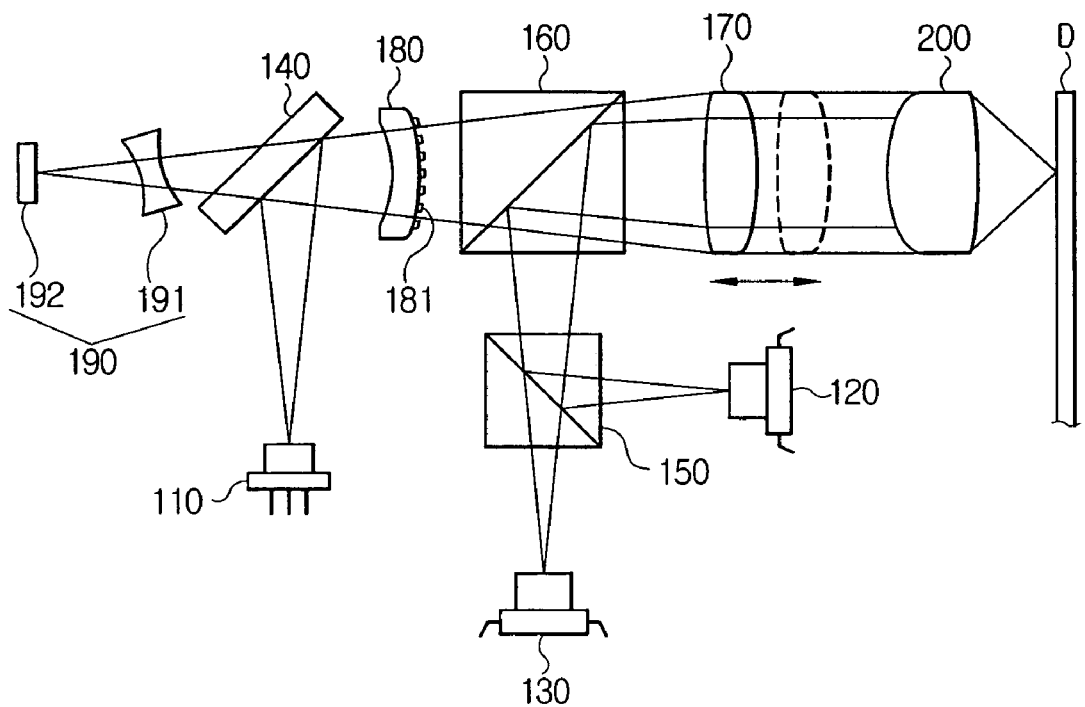
FIG. 2 schematically shows an optical pickup which is compatible with different types of media according to one exemplary embodiment of the present invention.

As shown in FIG. 2, an optical pickup which is compatible with different types of media according to one exemplary embodiment of the present invention includes three light sources for emitting lights having different wavelengths, that is, a first light source 110 for generating and emitting light having a short wavelength for a BD (for example, 405 nm), a second light source 120 for generating and emitting light having a long wavelength for a DVD (for example, 650 nm), and a third light source 130 for generating and emitting light having a long wavelength for a CD (for example, 780 nm).

In the illustrated exemplary embodiment, although the second light source 120 is formed independently of the third light source 130, the two laser diodes are mounted on the same substrate. Therefore, the second light source 120 may be integrally formed with the third light source 130, as a modular form.

Furthermore, although not illustrated, the second light source 120 and the third light source 130 may be formed as a hologram module. A hologram module refers to a detecting unit, such as a photodiode, which is integrally formed with a light source. Since this technology is well known to those of ordinary skill in the art, a detailed explanation is omitted. Likewise, the details of the arrangement of additional photodiodes and the like for forming a detecting unit are omitted for brevity.

The light paths of the lights with different wavelengths that are emitted from the first, second and third light sources 110, 120 and 130, are changed in their respective light paths by light path changers so that the light paths are directed into a recording medium D. The lights are focused onto the recording medium D by an objective lens 200.

The light path changers include a first beam splitter 140, a second beam splitter 150, and a third beam splitter 160. The first beam splitter 140 reflects light emitted from the first light source 110 toward an objective lens. The second beam splitter 150 reflects light emitted from the second light source 120 and transmits light emitted from the third light source 130.

The third beam splitter 160 transmits light that has passed through the first beam splitter 140 and reflects light that has passed through the second beam splitter 150.

The first beam splitter 140 is designed to transmit light which is reflected from the recording medium so that a detecting unit (which is described in detail later) may receive the light. The second and third beam splitters 150 and 160 respectively are preferably cubic beam splitters which reflect or transmit light depending on the wavelength of the light.

The collimating lens 170 is disposed in the front of the objective lens 200. More specifically, the collimating lens 170 is disposed so that the light whose path is changed by and which comes out of the third beam splitter 160 is changed into a parallel light beam. The parallel light beam is then incident on the objective lens 200. The collimating lens 170 is disposed in the front of the objective lens 200, and thereby one collimating lens may collimate lights with different wavelengths without using multiple collimating lenses. Accordingly, the optical pickup according to the exemplary embodiments of the present invention has a simple structure and is compact, particularly in comparison to conventional optical pickups which use several collimating lenses.

In addition, the collimating lens 170 is preferably movably disposed along the direction of the optical axis of the collimating lens to correct a spherical aberration that occurs due to variations in the thickness of the recording medium.

Since the method of correcting a spherical aberration by driving such a collimating lens 170 is a known technique, a detailed explanation is omitted for conciseness. Briefly, however, when the light emitted from the first light source 110 is for use with a BD, the collimating lens 170 is moved closer towards the objective lens 200, and when the light emitted from the second and third light sources 120 and 130 are for use with a DVD or a CD, respectively, a spherical aberration is correctable by moving the collimating lens 170 away from the objective lens 200. The dotted line and arrow in FIG. 2 illustrate the movement of the collimating lens.

In addition, an optical pickup which is compatible with different types of media according to the exemplary embodiments of the present invention includes a diffractive optical element 180 disposed between the first beam splitter 140 and the third beam splitter 160. The diffractive optical element 180 has, at the side face which faces the objective lens 200, a diffractive face 181 which comprises a number of circular irregularities, for example. Accordingly, light having a short wavelength for a BD which is transmitted through the diffractive optical element 180 diverges or converges a little due to the diffractive face 180, and a chromatic aberration according to wavelength variation is corrected according to such an action.

That is, an optical pickup which is compatible with different types of media according to exemplary embodiments of the present invention collimates lights with different wavelengths by using one collimating lens 170, corrects a spherical aberration according to the wavelength, and corrects a chromatic aberration when using light with a short wavelength, using the diffractive optical element 180.

A detecting unit 190 receives light reflected from the recording medium D that has passed through the objective lens 200 and the light path changers 140, 150 and 160 and then detects an information signal and/or an error signal. The detecting unit 190 includes a detecting unit for a BD, a detecting unit for a DVD, and a detecting unit for a CD. In this exemplary embodiment of the present invention, the detecting unit 190 for a BD is illustrated and described. Detecting units for the other recording media may be integrally formed with the respective light sources 120 and 130, as described above.

The detecting unit 190 for the BD includes a sensor lens 191 disposed at the rear of the first beam splitter 140. The sensor lens condenses the light which is transmitted by the beam splitter 140 and focuses the light onto a photodiode 192. The structure and operation of such a detecting unit is well known to those skilled in the art, so a detailed explanation is omitted for conciseness.

The operation of the optical pickup which is compatible with different types of media constructed above according to the exemplary embodiments of the present invention will now be described.

The light path of the light emitted by the respective light sources 110, 120, and 130 is changed by the beam splitters 140, 150 and 160, respectively, and are focused onto the recording medium D by the objective lens 200 and then reflected. Through such a process, information is recorded onto the recording medium or recorded information is reproduced from the recording medium. The actual process of recording and reproduction of information according to the present invention is not significantly different from the process performed by conventional optical pickups. In the exemplary embodiment of the present invention, however, one collimating lens 170 collimates the respective lights having different wavelengths. In addition, when using a light having a short wavelength for a BD, the collimating lens 170 is movable along the direction of an optical axis to correct a spherical aberration. Furthermore, when using a light having a short wavelength for a BD, a chromatic aberration that occurs due to the change of wavelength or the like is corrected by the diffractive optical element 180.

The optical pickup which is compatible with different types of media according to the exemplary embodiments of the present invention as explained above collimates lights having different wavelengths with one collimating lens, corrects a spherical aberration of light having a short wavelength by moving the collimating lens, and corrects a chromatic aberration of light having a short wavelength by the diffractive optical element. Accordingly, a compact optical system having a simple, and smaller, structure is possible.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An optical pickup, which is compatible with different types of media, comprising:
   first through third light sources for emitting lights with different wavelengths, respectively;
   light path changers for changing the respective paths of light emitted by the plurality of light sources;
   an objective lens for condensing the incident light from the light path changers onto a recording medium;
   a single collimating lens that does not include more than one lens, the collimating lens being disposed to collimate the incident lights from all light sources, and to output collimated light directly to the objective lens, the collimating lens being movable to correct a spherical aberration; and
   a diffractive optical element disposed in a path of a light having a short wavelength, the diffractive optical element having a diffractive surface for correcting a chromatic aberration.

2. The optical pickup which is compatible with different types of media according to claim 1, wherein the first light source is for emitting light having a short wavelength for use with a blu-ray disc (BD), the second light source is for emitting light having a long wavelength for use with a digital versatile disc (DVD), and the third light source is for emitting light having a long wavelength for use with a compact disc (CD).

3. The optical pickup which is compatible with different types of media according to claim 2, wherein the light path changers comprise:
   a first beam splitter for reflecting light emitted from the first light source;
   a second beam splitter for reflecting light emitted from the second light source and for transmitting light emitted from a third light source; and
   a third beam splitter for transmitting light that has passed through the first beam splitter and for reflecting light that has passed through the second beam splitter.

4. The optical pickup which is compatible with different types of media according to claim 3, wherein the first beam splitter reflects light from the first light source toward the objective lens.

5. The optical pickup which is compatible with different types of media according to claim 4, wherein the second beam splitter reflects and transmits light toward the objective lens.

6. The optical pickup which is compatible with different types of media according to claim 5, wherein the third beam splitter reflects and transmits light toward the objective lens.

7. The optical pickup which is compatible with different types of media according to claim 3, wherein the collimating lens is movably disposed between the third beam splitter and the objective lens so that it is movable in the direction of an optical axis of the collimating lens.

8. The optical pickup which is compatible with different types of media according to claim 3, wherein the diffractive optical element is disposed between the first beam splitter and the third beam splitter and the diffractive face of the diffractive optical element is formed at the side face of the diffractive optical element which faces the objective lens, the diffraction optical element transmitting light only from the first light source.

9. The optical pickup which is compatible with different types of media according to claim 3, further comprising:
   a detecting unit which receives light reflected from the recording medium and detects an information signal and/or an error signal.

10. The optical pickup which is compatible with different types of media according to claim 9, wherein the detecting unit includes a detecting unit for a BD, a detecting unit for a DVD, and a detecting unit for a CD.

11. The optical pickup which is compatible with different types of media according to claim 10, wherein the detecting unit for the DVD and the detecting unit for the CD are integrally formed with the second light source and the third light source, respectively.

12. An optical pickup which is compatible with different types of media comprising:
   a first light source for generating light having a first wavelength;
   a second light source for generating light having a second wavelength;
   a third light source for generating light having a third wavelength;
   an objective lens for focusing light incident upon the objective lens onto a recording medium;
   a first beam splitter for reflecting light emitted from the first light source towards the objective lens;
   a second beam splitter for reflecting light emitted from the second light source towards the objective lens and for transmitting light emitted from the third light source towards the objective lens;
   a third beam splitter for transmitting light that has passed through the first beam splitter towards the objective lens and for reflecting light that has passed through the second beam splitter towards the objective lens;
   a single collimating lens disposed between the third beam splitter and the objective lens, the collimating lens collimating light from the first, second, and third light sources, and having an optical axis and being movable along the optical axis to correct a spherical aberration; and
   a diffractive optical element disposed only in a path of the light generated by the first light source, the diffractive optical element having a diffractive surface to correct a chromatic aberration.

13. The optical pickup which is compatible with different types of media according to claim 12, wherein
   the first light source emits light having a first wavelength suitable for use with a blu-ray disc (BD),
   the second light source emits light having a second wavelength suitable for use with a digital versatile disc (DVD), and
   the third light source emits light having a third wavelength suitable for use with a compact disc (CD).

14. The optical pickup which is compatible with different types of media according to claim 13, wherein
   the first wavelength is about 405 nm,
   the second wavelength is about 650 nm, and
   the third wavelength is about 780 nm.

15. The optical pickup which is compatible with different types of media according to claim 13, wherein the second beam and third beam splitters are cubic beam splitters.

16. The optical pickup which is compatible with different types of media according to claim 12, further comprising:
   a detecting unit that receives light reflected by the recording medium and detects an information signal and/or an error signal.

17. The optical pickup which is compatible with different types of media according to claim 16, wherein the detecting unit includes a detecting unit for a BD, a detecting unit for a DVD, and a detecting unit for a CD.

18. The optical pickup which is compatible with different types of media according to claim 17, wherein the detecting unit for the DVD and the detecting unit for the CD are integrally formed with the second light source and the third light source, respectively.

* * * * *